Nov. 2, 1954 — C. E. WEBB — 2,693,016
CLAY PIPE-CUTTING AND DIE LUBRICATING APPARATUS
Filed June 4, 1953 — 4 Sheets-Sheet 1

INVENTOR.
Cecil E. Webb.
BY Wood, Herron & Evans.
ATTORNEYS.

Nov. 2, 1954     C. E. WEBB     2,693,016
CLAY PIPE-CUTTING AND DIE LUBRICATING APPARATUS
Filed June 4, 1953     4 Sheets-Sheet 2

INVENTOR.
BY Cecil E. Webb.
Wood, Herron & Evans
ATTORNEYS.

Nov. 2, 1954 — C. E. WEBB — 2,693,016
CLAY PIPE-CUTTING AND DIE LUBRICATING APPARATUS
Filed June 4, 1953 — 4 Sheets-Sheet 4

INVENTOR
Cecil E. Webb
BY Wood, Herron & Evans.
ATTORNEYS.

2,693,016

CLAY PIPE-CUTTING AND DIE LUBRICATING APPARATUS

Cecil E. Webb, Cincinnati, Ohio, assignor to M. S. Bowne, Clearfield, Ky., trustee Application June 4, 1953, Serial No. 359,480

17 Claims. (Cl. 25—39)

This invention relates to the extrusion of clay sewer pipes and is directed in particular to an improved pipe cutting and die lubricating apparatus which is mounted as a unit upon an extrusion machine and utilized to sever the extruded pipes and deposit lubricant upon the surfaces of the former die and movable former cap.

An apparatus of this general class is disclosed in the copending application of Cecil E. Webb entitled "Pipe Extrusion Apparatus," Serial No. 276,118, which was filed on March 12, 1952. The copending application discloses an automatic apparatus for controlling the operating cycles of a steam operated extrusion press in the rapid production of sewer pipes comprising a spigot or pipe length having an enlarged socket or coupling head at one end. The socket is molded in a former die having a former cap which moves axially with respect to the former die and the spigot or pipe length is thereafter expressed from the extrusion die. A pipe cutting mechanism and lubricator nozzle are mounted for rotation upon the axis of the extrusion in a plane within the former die and adjacent the delivery end of the extrusion die.

At the start of an operation, the cap is locked to the former die and plastic clay is extruded into the former die cavity to provide the socket. Thereafter, the cap is unlocked and the spigot portion of the pipe is extruded from the die at a rapid rate, forcing the cap downwardly until the desired length of extruded pipe is obtained. At this point, the cutoff mechanism severs the extruded pipe and the cap overtravels, then returns to the die where it is locked for the next operation.

However, just before reaching the die, the lubricator nozzle is effective to spray lubricating oil upon the surfaces of the moving cap and die to prevent the clay from sticking to the die surfaces.

The cutoff knife mechanism is provided with a knife blade which extends itself outwardly when the cutting mechanism is rotated so as to sever the extruded pipe and which retracts when stopped abruptly so as to reside within the pipe as it is extruded. The cap is provided with an open top and the retracted knife blade and nozzle nest within the cap when the cap enters the die. It is critical therefore, that the blade be retracted fully before the cap enters the die otherwise the mechanism would be damaged or at least it would be impossible to extrude a pipe until the condition is corrected.

The present structure follows broadly the cutoff and lubricating equipment disclosed in the copending application and is intended to be used in conjunction with the automatic apparatus or controlled manually. It will be understood that the knife mechanism includes a driving system which provides abrupt rotation and stopping to advance and rotate the blade and to retract it after the severing operation is executed.

One of the primary objects of the invention has been to provide a simplified cutoff mechanism having an inexpensive cutting blade which can be replaced when worn without dismantling the knife mechanism or the die in which it resides and in which the blade advances and retracts in a positive manner in response to its driving system.

The plastic clay has a pronounced abrasive action upon the knife blade and under constant operation, the blade wears out and must be replaced every few days. Therefore, rapid and convenient replacement of the blade without requiring the machine to be shut down for a prolonged period is an important aspect of the present structure. Also the dies of the extrusion machines are replaced from time to time to accommodate larger or smaller pipe sizes according to production requirements and in the event that a major change in diameter is made, the present cutoff mechanism may be replaced conveniently as a unit to accommodate the new pipe diameter.

Another object of the invention has been to provide a structure in which the knife blade is free to move bodily with respect to the longitudinal axis of the pipe such that upon completion of a cutting operation the blade is shifted out of contact with the severed end of the pipe to allow the blade to retract with practically no resistance when the knife mechanism is stopped abruptly by the driving system.

Briefly described, the present cutoff structure comprises a rotatable shaft and a knife blade having an end pivotally mounted on an axis parallel to the rotatable shaft but displaced outwardly from it; thus the blade is free to swing into an extended position by centrifugal force upon rapid rotation of the shaft and to swing to retracted position upon abrupt stopping of the shaft. The pivotal mounting of the blade permits it to move bodily for a predetermined distance from an initial plane to a higher cutting plane and the blade has a chamfered cutting edge which planes against the clay wall and raises the knife in a partially spiral path to its higher cutting plane at the start of an operation. A compression spring biases the blade in the opposite direction, causing the blade to move bodily away from the severed end of the pipe at completion of the cutting operation, such that the blade is free to retract without any resistance upon abrupt stopping of the rotating assembly. In addition, a cam structure locks the knife in retracted position to prevent accidental displacement of the blade and consequent damage to the mechanism and provides a detent action which requires the mechanism to come up to full speed before releasing the blade. Sudden release causes the blade to extend and to pierce the clay wall rapidly and provides a cleaner line of severance.

In order to apply lubricant simultaneously to the internal surface of the former die and to the external surface of the moving cap, the atomized lubricant must be expelled when the cap is within predetermined proximity to the die. If the spray is expelled either too soon or too late, then the oil film will be imperfect and the socket will not strip cleanly from the die surfaces. While it is not difficult to set up the control system to discharge a blast of atomized lubricant and compressed air in proper timing, the oil has a tendency to adhere to the surfaces of the passageways leading to the nozzle.

This causes a certain percentage of the oil to drain from the nozzle after the air blast, with the result that the oil which should have been deposited upon the die surfaces is wasted even though the apparatus is properly timed. It has been customary to set the apparatus for an excess discharge of oil to compensate for waste.

A further object of the invention has been to provide an improved lubricator nozzle including a reservoir adapted to accumulate the oil which would otherwise drain from the nozzle, such that the residual oil is sprayed upon the die surfaces with the next successive blast of air and lubricant instead of being wasted.

The present nozzle is in the form of a hollow disklike body having discharge apertures around its periphery and having a depression at its center immediately beneath an air blast passageway. Upon application of the air blast, the residual oil accumulated after a previous blast is ejected from the pool and outwardly through the apertures. Thus each discharge blast includes a percentage of accumulated oil and a percentage of fresh oil with complete elimination of waste.

A further object of the invention has been to utilize the rotary motion of the cutoff knife in combination with the nozzle to displace the lubricant outwardly from the reservoir by centrifugal force and thereby accelerate the ejection of the lubricant and improve the timing of the apparatus.

As explained earlier, the lubricator nozzle is mounted upon the axis of rotation of the knife mechanism and is rotated and stopped with the cutoff mechanism in advance of the lubricating operation. Accordingly, the oil in the reservoir is displaced outwardly to the periphery of the nozzle by centrifugal force prior to the application of the air blast to provide immediate response of time with the movement of the cap.

According to the present structure the lubricator nozzle has a relatively large diameter and the cutoff knife in retracted position resides within the confines of the nozzle so as to nest as a unit within the former cap. In other words, the diameter of the nozzle is related to the pipe diameter and to the swing of the cutoff knife and the assembly can be interchanged readily in order to provide the required pipe diameter.

Other features and advantages of the invention will be more clearly apparent to those skilled in the art from the following description taken in conjunction with the drawings.

In the drawing:

Figure 3 is an enlarged sectional view taken from Figure 1, showing the movable former cap locked to the former die, with the clay socket of the pipe formed in the cavity of the die.

*General arrangement and operation*

As explained above, the present cutoff mechanism and lubricant nozzle are intended primarily but not exclusively for use with a conventional steam operated pipe extrusion press of the type disclosed in the copending application. In the past, such presses have been operated manually by a team of workers acting in concert with a press operator. The copending application discloses an apparatus for converting the press to rapid automatic cyclic operation in response to the manipulation of the main press control lever, and, as explained above, includes a cutoff knife and lubricating apparatus.

The present cutoff mechanism and lubricant nozzle can be controlled automatically or by hand but the principles of operation can be best disclosed in conjunction with the automatic apparatus of the copending application. Briefly, under control of the automatic apparatus, the cycle starts with the former cap locked to the die, as shown in Figure 3 of the present application. In this position the cap and die form a cavity suitable to mold the socket upon movement of the press lever to extruding position. The structure and operation of the former die and former cap are explained in greater detail later with reference to Figure 3. After the socket is molded, the operator shifts the press lever to a position which relieves the clay pressure in the die cavity. This lever motion concurrently unlocks the former cap for movement away from the die.

Figure 4:
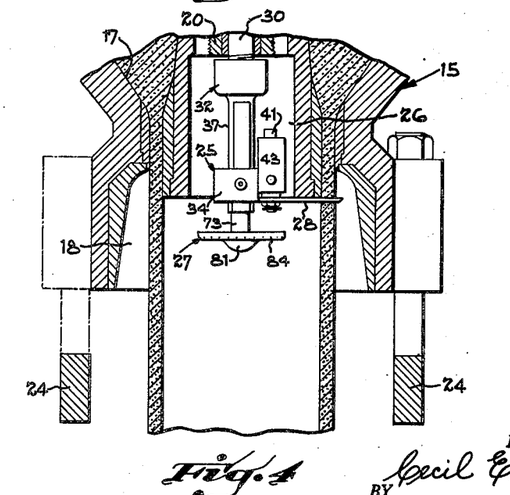
Figure 4 is a view similar to Figure 3, showing the clay column or spigot portion of the pipe, with the cap propelled away from the die and the cutoff knife in extended position at the start of the pipe severing operation.

As soon as the cap is unlocked, the operator again shifts the lever to extruding position, causing the spigot or clay column of the pipe to be extruded as shown in Figure 4. The extruding pipe column propels the former cap downwardly at high speed away from the die, and when the spigot reaches the required length, the operator shifts the press lever to relief position to stop the extrusion and allow the extruded pipe to be severed and removed from the machine.

Due to the speed at which the clay column is extruded, the former cap continues its downward motion under momentum, leaving the pipe suspended from the die. Upon reaching its downward limit, the former cap structure trips a cutoff switch which is effective to rotate and extend the cutoff knife. The knife severs the extruded pipe in a plane within the extrusion die and thereafter retracts, and at this point the severed pipe is removed from the press.

The former cap, which is biased upwardly, now returns back toward the former die, and during its return motion, trips a lubricating switch which causes the lubricant nozzle to spray lubricating oil upon the surfaces of the former cap and die as the cap approaches the die. Upon entering the die, a cap locking switch is tripped which is effective to lock the cap to the die and condition the machine for the next cycle of operation.

From the foregoing brief outline of the automatic apparatus, it will be understood that the structure, as disclosed in the copending application, includes a driving system for rotating and stopping the cutoff mechanism and that the knife blade is extended and retracted in response to the abrupt rotation and braking forces acting upon the cutoff mechanism. It will also be understood that the automatic apparatus includes a lubricant supply system connected to the spray nozzle and that the nozzle is mounted in common with the cutoff mechanism and rotatable in unison with it.

Figures 1, 2:
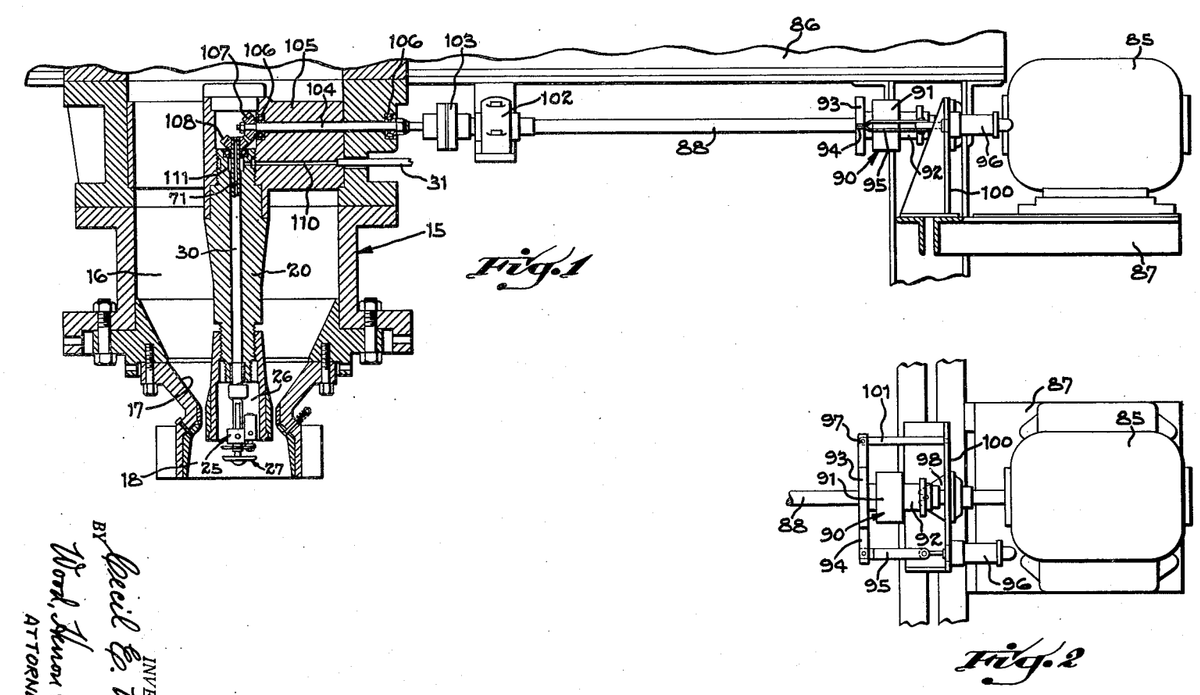
Figure 1 is a fragmentary sectional view illustrating the general arrangement of the driving system, the cutoff knife assembly and lubricant nozzle in relation to the extrusion die structure of a steam press.
Figure 2 is a fragmentary top plan view of the motor and clutch-brake mechanism which imparts abrupt rotation and braking to the cut-off knife blade to extend and retract the blade.

The present cutoff mechanism and lubricant nozzle are disclosed in Figure 1 of the drawings in relation to a similar driving system, but the lubricant supply system, which is a commercial product, has been omitted from the drawings. Although the cutoff mechanism and lubricant nozzle follow the general operating principles disclosed in the copending application, both have been improved to provide more efficient operation as explained earlier. Moreover, the improved lubricant nozzle takes advantage of the rotation of the cutoff mechanism to improve the application of lubricant to the die surface; thus there is a mutual cooperation between these two elements in utilizing the driving system to execute the severing operation and to condition the nozzle for immediate delivery of the residual oil which it accumulates.

Since the present improvements relate explicity to the structure of the cutoff knife and lubricator nozzle, a complete disclosure of the steam press and associated parts in the present application is not necessary to arrive at an understanding of the principles of the invention. The general arrangement of the cutoff mechanism, its driving system, and lubricating nozzle, is illustrated in Figure 1 in conjunction with the die assembly which extends downwardly from the extrusion press. As shown, the extrusion die assembly, indicated generally at 15, is of sectional construction providing a cylindrical bore 16 in communication with the extrusion chamber which is not shown. The lower portion of the extrusion die includes a restricted throat section 17 communicating with the former die 18 in which the socket is molded.

A core die or mandrel 20 extends axially through the former die and restricted throat into the former die; thus the core die or mandrel 20 delineates the inside diameter of the spigot portion of the pipe and the restricted throat 17 delineates its outside diameter. The outside diameter of the pipe socket is determined by the diameter of the former die 18 and its inside diameter is determined by the movable former cap 21 as shown in Figure 3.

It will be observed that the sectional construction of the extrusion die permits various sizes of dies to be installed as required for various pipe diameters. It will also be understood that corresponding mandrels are also installed with the dies to provide the required inside diameters. Former caps and former dies of suitable size are also installed to provide the necessary socket diameters and configuration.

Referring to Figure 3, it will be noted that the former cap 21 is mounted for vertical movement upon the table rod 22 and is locked in closed position by means of the rollers 23 in locking engagement with respect to the hooks 24 which are secured to the former die. This structure corresponds to that disclosed in the copending application and the drawing illustrates the formation of a socket at the start of a pipe extruding operation.

Figure 8:
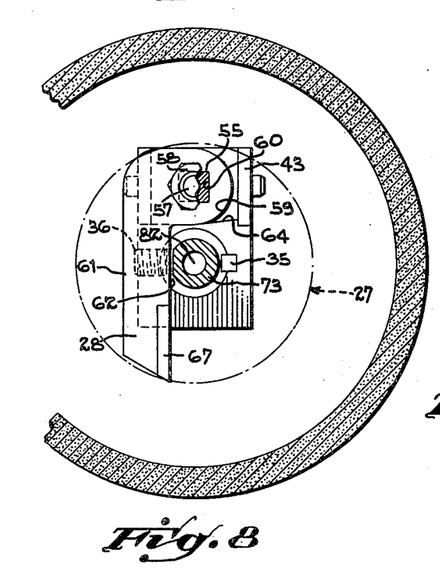
Figure 8 is a sectional view taken on line 8—8, Figure 7, showing the cutoff knife blade in its normal retracted position with respect to a clay pipe.

The present improved cutoff knife and nozzle structure are mounted in the same position as the corresponding structure disclosed in the copending application. In other words, the cutoff knife assembly, which is indicated generally at 25, (Figure 3), nests within an opening 26 in the top of the former cap and the lubricating nozzle indicated generally at 27, also resides within the cap when it is locked to the die. As shown in Figure 8, the knife blade 28 is retracted to a position to nest within the opening 26; it will also be noted that the lubricant nozzle is smaller in diameter than the opening and that the blade 28, when retracted, resides with the confines of the lubricant nozzle indicated in broken lines.

It will be noted in Figure 4, that the blade 28 of the cutoff knife rotates in a horizontal plane immediately below the end of the mandrel or core die 20 so as to sever the extruded pipe flush with the end of the die. This allows the cap to enter the die at the end of the cycle as shown in Figure 3 without jamming against the clay column previously severed and allows the cap to be rotated to locking position without resistance.

As indicated earlier, the various sewer pipe sizes are produced by installing upon the extrusion machine interchangeable dies and former caps of the required size; it follows therefore, that corresponding cutoff knife assemblies and lubricating nozzles must also be installed. If the change is minor, such as one or two inches, a change in the length of the blade 28 is sufficient to accommodate the new diameter. However, if the change in diameter is major, the entire cutoff knife assembly is removed and replaced with one having components of proportionate size. For this purpose, the knife assembly may either be removed as a unit for replacement or the assembly may be left in place and the blade alone removed for replacment. The lubricating nozzle is a one-piece unit and forms a part of the replaceable assembly; however it is replaceable independently of the cutoff knife assembly if desired.

Since the former cap reciprocates rapidly through successive extrusion cycles, it is imperative that the blade 28 be retracted in a positive manner before the cap returns to the die and that it be locked positively in retracted position. In other words, if the blade failed to retract, it would extend into the path of the cap and would be broken or damaged when the cap enters the die.

Figure 11:
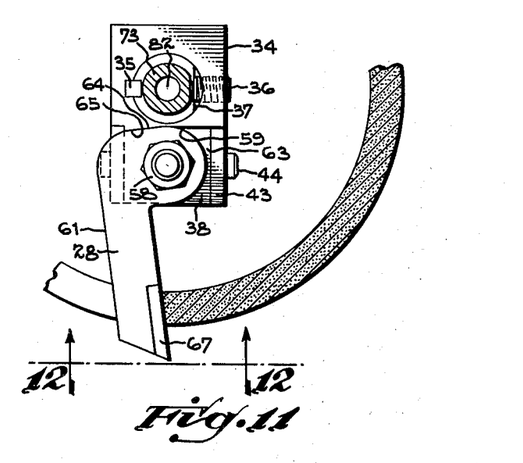
Figure 11 is a view similar to Figure 8, showing the knife blade piercing the pipe wall as it snaps to its fully extended position.

As explained later in detail, the blade is shifted from the retracted position shown in Figure 8 to the extended position shown in Figure 11 by rotating the assembly at sufficient speed to swing the knife outwardly by centrifugal force. In order to provide positive locking of the knife in retracted position, the structure incorporates a cam structure which provides a detent action capable of locking the blade normally in retracted position. The arrangement is such that the assembly must come up to full speed before centrifugal force is generated which is sufficient to overcome the detent action and extend the knife. In other words, when the assembly reaches its maximum speed of rotation, the centrifugal force acting upon the blade overcomes the resistance of the cam and snaps the blade suddenly to its fully extended position. This is found to provide a cleaner line of severance since the end of the blade is propelled at high speed through the clay wall to pierce it at one point instead of dragging progressively more deeply before penetrating the wall.

After completing several revolutions, the brake is applied to stop the knife abruptly causing the blade to swing by momentum from its extended to its retracted position and upon being fully retracted, the cam arrangement is effective to lock the blade positively in retracted position clear of the opening in the former cap. Thus, the cam arrangement thus has the two-fold purpose of locking the blade in retracted position to prevent interference with the former cap and to require the knife assembly to reach full speed before extending the knife to provide a more efficient severing operation.

As noted earlier, an important feature of the present cutoff knife resides in the mounting arrangement for the blade which allows the blade to move downwardly away from the severed end of the pipe in the die at completion of the severing operation. The downward movement of the blade frees the blade of any resistance which would otherwise be caused by contact with the severed end of the pipe and thus allows it to retract freely. This contributes directly to the proper retraction of the blade when rotation is halted.

In order to provide the movement of the blade away from the severed end of the pipe, the blade is mounted upon the lower end of a shaft which has its upper end confined in bearings providing a predetermined amount of axial motion. The shaft is spring biased in a direction to urge the blade downwardly and also to rotate the knife toward retracted position.

The knife blade is provided with a cutting edge which is chamfered in a direction to plane the knife upwardly as it penetrates the wall of the clay pipe. The climbing action of the knife causes it to force the shaft upwardly in addition to the upward movement provided by the cam structure as the knife rotates in a horizontal plane, so long as the chamfered cutting edge is passing through and severing the pipe wall. However, after the wall is completely severed, the absence of cutting resistance allows the blade to move bodily away from the severed end so that it is free to retract without resistance as soon as the brake is applied.

The mounting structure of the blade combined with its chamfer has the additional function of allowing the knife to sever the pipe without damage to the blade even though the clay column is issuing from the extrusion die as the blade rotates. In this event, the blade spirals upwardly with respect to the downwardly moving clay wall by virtue of its vertical freedom and will continue to cut so long as the column advances. However, as soon as the column stops, the blade will complete its cutting action and drop from the severed end ready to be retracted, as outlined above.

Another aspect of the present invention, as explained earlier, resides in the utilization of the rotation of the knife assembly to provide a more efficient and economic distribution of the lubricant. The lubricant is fed to the nozzle 27 by means of a commercial lubricant supply system (not shown) which feeds a mixture of atomized oil by means of a blast of compressed air to the nozzle. In practice it is found that a certain percentage of the oil adheres to the surfaces of the delivery passageways and drains downwardly into the nozzle causing leakage of lubricant after the lubricant switch is tripped.

Figure 5:
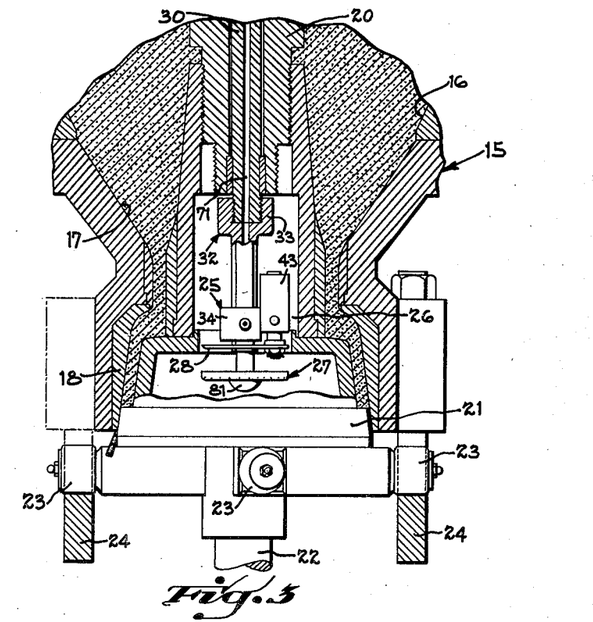
Figure 5 is an enlarged fragmentary side elevation of the cutoff knife assembly and lubricant nozzle, with the knife blade in retracted position.
Figures 5, 6:
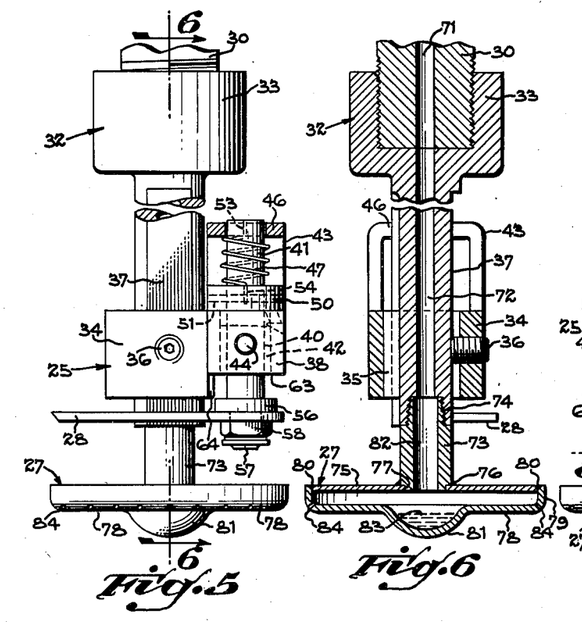
Figure 6 is a sectional view taken on line 6—6, Figure 5, further detailing the cutoff knife and nozzle structure.

According to the present invention, the lubricator nozzle is in the form of a disc-shaped hollow body as best shown in Figure 6 and includes a depression in its bottom to receive and store the oil which normally adheres and seeps downwardly from the lubricant delivery passage after the lubricant switch is tripped momentarily. Later in the cycle, when the knife and nozzle are rotated to sever the pipe, the pocket of oil is displaced by centrifugal force outwardly from the pocket to the peripheral wall of the nozzle. The oil remains adjacent the peripheral wall momentarily, and when the lubricator switch is tripped, the compressed air is effective to produce an immediate ejection of the accumulated oil, properly timed to the position of the moving cap to provide the most effective distribution of the atomized oil. Following the blast of compressed air, the adhering lubricant again drains to the depression to form a pool which is distributed upon the next lubricant cycle.

From the foregoing, it will be seen that the nozzle prevents any leakage of oil in the interval between lubricant cycles and thus prevents waste of lubricant. In addition the nozzle takes advantage of knife rotation to distribute the collected oil to the periphery of the nozzle to provide a faster response to the lubricant switch and to provide a more effective application of the lubricant since the discharge occurs at proper timing with respect to the moving of the former cap.

Cutoff knife assembly

As shown in Figure 1, the knife assembly 25 is mounted upon the lower end of the vertical drive shaft 30 which is rotatably mounted in the center of the core die. This shaft also includes an axial bore which supplies lubricant to the nozzle 28. Drive shaft 30 is driven by means of a motor and driving system as shown in Figure 1 and a mixture of lubricant and compressed air is supplied by the conduit 31 which is in communication with a lubricant and compressed air supply system (not shown). The construction and operation of the driving system and lubricant supply passageways follows that disclosed in the copending application and is described later.

As best shown in Figure 5, the knife assembly is mounted upon the lower end of a knife spindle 32 which includes a threaded hub 33 at its upper end in screw threaded engagement with the lower end of the shaft 30. Upon the lower portion of spindle 32 there is adjustably secured a mounting block 34 which carries the knife assembly. Block 34 may be adjusted vertically such that the blade trims the pipe flush with the end of the core die as shown in Figure 4. The block 34 is non-rotatably attached to the spindle by means of a key 35 (Figures 6 and 8) and is locked in vertically adjusted position by the set screw 36 passing through the block into clamping engagement with a flat 37 formed on the spindle. The set screw allows the cutoff mechanism to be adjusted vertically upon the spindle to bring the blade to its operating plane beneath the core die as shown in Figure 3. The block 34 includes a lateral extension 38 which includes a vertical bore 40 rotatably journalling the knife shaft 41 upon an axis parallel with and spaced outwardly from the axis of spindle 32. Bore 40 includes a bronze bushing 42 which forms a bearing for the shaft.

Figure 7:
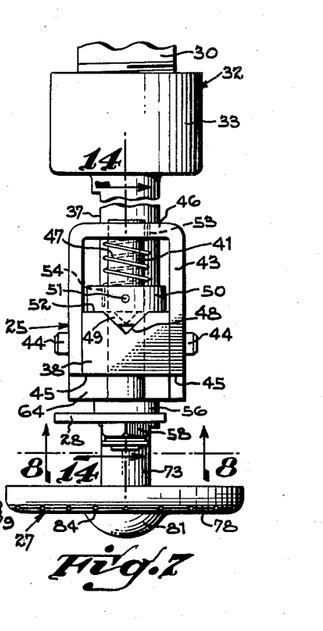
Figure 7 is a view of the cutoff knife assembly and nozzle as viewed at right angles to Figure 5.

As best shown in Figure 7, a U-shaped bracket 43 straddles the block extension 38 and is attached by screws 44—44 passing through the lower ends of the limbs into threaded engagement with the block. The block is recessed on opposite sides to provide the abutments 45—45 which engage the lower ends of the limbs and stabilize the bracket. The upper end of the knife shaft is journalled in a bore formed in the connecting strap 46 of bracket 43. The purpose of the bracket is to stabilize the knife shaft and provide a retainer for a knife biasing spring 47. The purpose and operation of the spring is described later.

Figure 10:
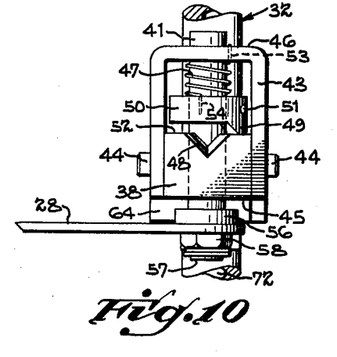
Figure 10 is a fragmentary side elevation of the cutoff knife assembly as viewed along the line 10—10, Figure 9, showing the knife and its component parts in a position corresponding to Figure 9.

The outer end portion of the block extension 38 is provided with a V-shaped cam or detent notch 48, which cooperates with a V-shaped spur 49 having cam surfaces complementary to the V-shaped notch. Spur 49 forms a part of a collar 50 which is pinned as at 51 to the knife shaft. When the knife is in retracted position as shown in Figure 8, the spur 49 is seated in the cam notch as shown in Figure 7 such that turning motion of the blade 28, which is secured upon the lower end of the shaft causes the spur to ride upwardly relative to the notch as shown in Figure 10.

Figure 9:
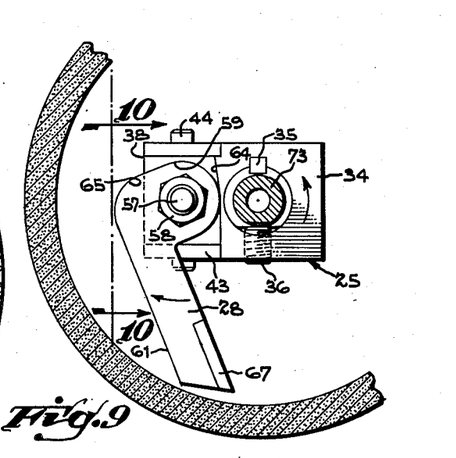
Figure 9 is a view similar to Figure 8, showing the motion of the blade as it snaps toward its extended position at the start of a severing operation.

In order to provide a predetermined amount of turning resistance, the spring 47 is under compression between the collar 50 and connecting strap 46 so as to exert a downward preload against the collar. This provides the initial turning resistance which requires the knife to rotate at full speed before centrifugal force is effective to snap to extended position. As soon as the detent action or resistance is overcome, the blade snaps outwardly as shown in Figures 9 to 11 and the flat end of the spur rides upon the flat upper surface 52 of the block extension as shown.

The addition to the downward preload, spring 47 also provides a torque resistance counter to the turning motion of the blade and shaft, tending to return the blade to retracted position. The turning resistance is relatively light in relation to the forces acting upon the blade in extended position, however, it contributes to the retracting force when rotation is halted. In addition, the spring safeguards the mechanism in that it is capable of retracting the blade by the torque energy stored in it in the event that the brake should accidentally fail to stop knife abruptly. The spring also locks the knife positively in retracted position since it forces the spur downwardly into the notch.

In order to provide the torque force, the respective opposite ends of the spring are anchored to the connecting strap 46 of the bracket and to the collar 50. For this purpose, the upper end of the spring is bent to provide a vertical stem 53 passing through an aperture formed in the vertical strap and the lower portion is provided with a similar stem 54 passing into a hole drilled in the collar 50. It will be noted that the spring is wound in a direction to tighten as the knife swings to extended position and that the spring is also compressed lengthwise as the spur 49 rides up the cam track as shown in Figure 10.

Figure 14:
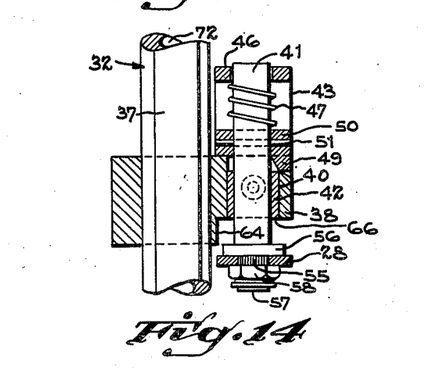
Figure 14 is a sectional view taken on line 14—14, Figure 7, further detailing the knife assembly.

As best shown in Figure 14, the knife shaft 41 includes a square portion 55 at its lower end for non-rotatably mounting the blade 28. The shaft further includes an integral collar 56 immediately above the square portion and a threaded end 57 below the square portion. The blade is secured on the shaft by a commercial lock nut 58 threaded upon the lower end of the shaft and clamping the blade against the collar 56. The blade includes a laterally offset end portion 59 having a square hole 60 which establishes a keyed connection with the square portion 55 (Figure 8). The lock nut 58 is not disclosed in detail since any one of several commercial nuts can be utilized.

The offset portion of the blade is proportioned to allow the shank 61 of the blade to reside in parallelism with the block 34 when in retracted position (Figure 8), with the shank of the blade disposed adjacent the flat 37 of spindle 32. The arrangement is such that the flat 37 provides a stop when the blade is snapped from its extended to its retracted position. It will be noted in Figure 8 that a slight clearance, indicated at 62, is provided between the edge of the blade and the flat, such that the closing impact force is absorbed by the detent action and by the direct contact with the flat to prevent excessive wear upon the parts. Thus when the blade snaps to closed position, the spur drops into its notch but the momentum of the blade overcomes the detent effect, at least partially, causing the blade to strike the flat then snap out of contact with it by operation of the spur.

Figure 12:
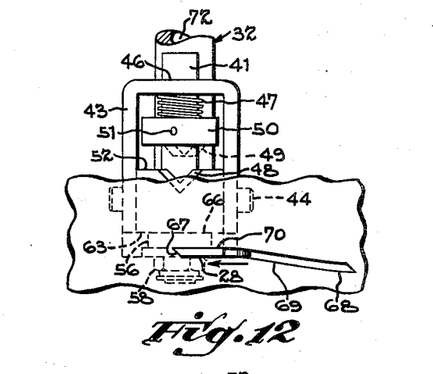
Figure 12 is a side elevation as viewed along line 12—12, Figure 11, showing the upward path of motion of the knife blade with respect to the clay pipe wall as the blade begins to rotate and sever the wall.

Referring to Figure 5, it will be noted that the extended portion 38 of mounting block 34 includes an inset 63 which provides an abutment surface 64 delineating the inset portion. When the blade snaps to its extended position as shown in Figure 11, the rearward edge 65 of the blade engages the abutment 64 to lock the blade in extended position as shown. It will be noted in Figure 12 that the inset 63 provides clearance for the collar 56 and that the collar abuts the lower surface 66 of the inset when the blade is fully elevated and locked in extended position.

As explained earlier, the cutting edge of the blade is chamfered as at 67 in a direction to cause the blade to plane upwardly as the chamfered edge penetrates and begins to sever the wall of the pipe. Referring to Figures 9 and 10, it will be observed that the spur 49 is effective to raise the blade vertically when the knife comes up to full speed and the spur disengages the notch. The blade thus penetrates the wall of the pipe in a lower plane as indicated by the cutting line 68 of Figure 12. Upon penetrating the wall, the chamfer of the blade, which is moving in the direction indicated in Figure 12, causes the blade to spiral upwardly as indicated at 69 until collar 56 contacts the lower surface 66 of the inset 63. Thereafter, the blade rotates in the elevated severing plane indicated at 70 and is maintained in the elevated position against the compression of spring 47 by reaction of the chamfered edge of the blade against the clay wall.

Figure 13:
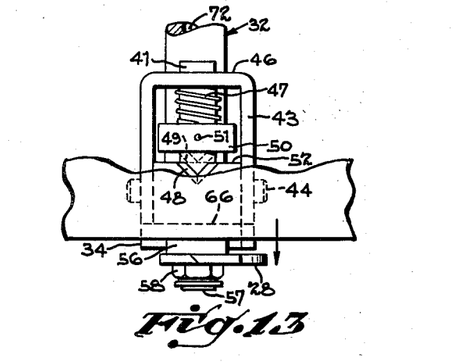
Figure 13 is a view similar to Figure 12, showing the downward motion of the blade away from the severed end of the clay pipe as the rotating blade completes its cutting operation but before the blade is braked to a stop and retracted.

As soon as the wall is completely severed and the pipe removed, spring 47 is effective to shift the blade downwardly away from the severed end of the pipe which remains in the die as indicated in Figure 13. In this position, the blade is ready to be snapped to retracted position as soon as the driving system is braked to a stop as explained later. It will be apparent at this point that the blade will move downwardly to the position shown in Figure 10, with the spur resting upon the flat surface 52 of the block, such that the blade will retract with practically no resistance when rotation stops. It will also be observed in Figures 10 and 13, that when the blade drops to its lower position, but before the spur enters the notch, the blade is disposed in a plane beneath the lower edge of mounting block 34. In this position the blade is free to swing to its retracted position beneath the block as shown in Figure 8 when stopped.

During automatic extruding of the pipes, the operator shifts the press lever to inoperative position when the required spigot length is obtained and the former cap continues moving downwardly to trip the cutoff knife as explained earlier. Normally therefore, the extruded pipe will depend in stationary position when the cutoff knife snaps open to sever it. Occasionally however, due to residual clay pressure or faulty timing, the spigot may continue issuing downwardly when the knife snaps to cutting position. The blade rotates at a rate which is sufficiently fast in relation to the moving pipe to allow it to climb the downwardly moving wall; therefore the blade will continue its cutting and upward spiralling action until the spigot stops advancing. Thus the bodily movement of the blade provides a safety factor which prevents damage to the blade and other components of the knife should the blade encounter the pipe wall while it is extruding.

As noted earlier, the abrasive action of the clay causes the knife blade to wear very rapidly and requires that the blade be replaced approximately every two days. The blade is relatively inexpensive and upon being worn, is replaced in a very simple manner by removing the nut 58. It will also be understood that the extrusion machines are arranged to rotate the cutoff knife either to the right or to the left. For rotation in the opposite direction, the blade is identical to that disclosed except that the chamfer is placed on the opposite side.

Lubricator nozzle

The lubricant is supplied to the nozzle 27 by way of the conduit 31 and through the bore 71 of shaft 30. As shown in Figure 6, spindle 32 has a bore 72 communicating with the bore of shaft 30 and the nozzle 27 includes a mounting nipple 73 having its upper end threaded as at 74 upon the lower end of the spindle. The nozzle is of preferably welded construction comprising a circular top plate 75 which is welded as at 76 to the lower end of the mounting nipple, the nipple preferably being shouldered as at 77 to provide a seat for the top plate.

The lower portion of the nozzle consists of a circular bottom plate 78 spaced downwardly from the top plate and having a peripheral side wall 79 which is welded as at 80 to the edge of the top plate. At the center of plate 78 there is provided a depression 81 disposed immediately beneath the bore 82 of the mounting nipple. The depression thus forms an oil reservoir disposed in a position to receive the residual lubricant which drains from the bore of the shaft and spindle between blasts, and as explained earlier, confines the lubricant in a pool as indicated at 83.

The nozzle is provided with spaced apertures 84 around its periphery formed at the juncture of the bottom plate 78 and peripheral wall 79. The apertures are drilled at an angle to provide an outwardly diverging blast of atomized oil, such that the lubricant film is deposited on the internal surface of the former die and upon the external surface of the former cap as it approaches the die.

Since the cutoff knife and nozzle are both rotated during the cutting operation, the oil which is confined in the pocket is forced outwardly by centrifugal force and distributed around the peripheral wall of the nozzle concurrently with the cutting operation. This occurs when the formed cap is at the downward limit of its travel and as it moves upwardly, the cutting mechanism is braked to a stop to retract the knife; therefore the oil is in a position to be immediately expelled from the nozzle when the cap trips the lubricator switch. The arrangement of the nozzle thus provides a quicker response since the oil is in position to be immediately expelled when the cap is in proper position to be lubricated.

During continuous operation therefore, the lubricant drains to the oil reservoir after each discharge while the lubricating system is inactive. The nozzle thus acts as an accumulator to prevent leakage of this oil and to confine it for immediate delivery upon the next air blast. It will also be observed that the bore 32 of the nipple is related to the depression such that the blast of compressed air has a scavenging action upon the oil pool. This empties the pool completely upon each operation such that the depression is capable of confining all of the residual oil following each air blast. In actual practice it has been determined that the structure not only provides more effective lubricant distribution but also, by eliminating waste, saves several quarts of oil per day.

Driving system

Described with reference to Figures 1 and 2, the cutoff mechanism and lubricator nozzle are driven by the motor 85 which is mounted upon the frame 86 of the extrusion machine. The motor is mounted upon a platform 87 attached to the frame 86 and is in driving connection with a drive shaft 88 through a commercial clutch-brake unit indicated generally at 90. The clutch-brake unit is adapted to rotate and brake the drive shaft which is in driving connection with the cutoff mechanism. In order to allow the speed of the cutoff knife to be changed in accordance with the diameter of the pipe, the motor is provided with speed change gears (not shown) which may be shifted to provide the necessary speed.

The clutch-brake unit 90 comprises a clutch 91 and brake 92 actuated by a yoke 93 so arranged that in one position the clutch is engaged to drive the shaft 88 and in the second position the brake is applied to abruptly stop the shaft. As described earlier, the cutoff knife is shifted to extended position by centrifugal force acting upon the blade as it accelerates to full speed, causing release of the spur 49 from the notch 48. Sudden application of the brake brings the rotating knife to a sudden stop, causing the blade to snap to its retracted position and the spur to reengage the notch. During the continuous extrusion of sewer pipes, motor 85 is energized continuously and the clutch and brake are applied when the cap structure opens and closes the cutoff switch at the limit of its stroke.

The yoke 93 is operated by a shifter 94 connected by a link 95 to an air cylinder 96 which is arranged to be controlled either automatically or manually as disclosed in the copending application. In its preferred form, air pressure is supplied constantly to the cylinder to draw the link 95 toward the cylinder. The shifter 94 is pivotally mounted as at 97 and will thus normally draw the yoke in a direction to engage the brake, with the clutch disengaged. Upon application of air pressure to the opposite end of the cylinder, the piston rod will be shifted outwardly, disengaging the brake and engaging the clutch to cause rotation of the cutoff mechanism.

As best shown in Figure 2, the stationary element of the brake is held against rotation by an arm 98 extending from a bracket 100 which is secured upon the motor platform 87. Bracket 100 also provides a mounting structure for the air cylinder 96 and for the bar 101 which pivotally mounts the end of the yoke shifter 94. Upon application of the brake, the turning force of the driving system and cutoff mechanism is transmitted by the brake to the fixed arm 98.

The outer end of drive shaft 88 adjacent the extrusion die is supported by a bearing 102 and is connected by a coupler 103 to a shaft 104 which projects into the die. Shaft 104 passes through an arm 105 which supports the mandrel or core die 20 within the extrusion die. The shaft is journalled in ball bearings 106—106 and its inner end includes a bevel gear 107 meshing with a bevel gear 108 mounted upon the upper end of the drive shaft 30. This completes the drive from the motor to the cutoff mechanism.

The air and lubricant mixture is conducted from the source of supply by way of the conduit 31 to a bore 110 which extends to an annular groove 111 surrounding the upper end of shaft 30. Suitable packing rings (not shown) may be utilized to seal the upper portion of the shaft within the groove. The shaft 30 includes radial holes (not shown) providing communication from the groove to the lubricant bore 71 of the shaft. The bore of shaft 30 extends downwardly to the lubricant nozzle as described earlier.

To recapitulate briefly, it will be perceived that the cutoff mechanism, by virtue of its simple cam and spring arrangement, severs the pipe more efficiently and extends and retracts in a positive manner to avoid interference with the reciprocating former cap, thereby preventing damage to the mechanism. By virtue of the blade chamfer, combined with its pivotal and axially shiftable mounting, the blade, while still extended, moves bodily away from the end of the severed pipe under the influence of the spring so as to retract freely. Moreover, this arrangement allows the blade to spiral upwardly in case the pipe is still advancing from the die when the blade begins to sever it, thus protecting the blade from damage and allowing it to retract freely as soon as the pipe stops advancing.

The lubricating nozzle prevents waste of lubricating oil by storing residual oil which would otherwise drain as excess and in so doing, provides more efficient lubrication of the cap and former die. Distribution of lubricant and timing is further improved by utilizing the centrifugal force developed by the rotating cutoff knife to displace the residual oil pool within the nozzle outwardly toward the apertures of the nozzle to be atomized and expelled immediately when the succeeding intermittent blast of air and atomized oil occurs. It will be understood that the driving system of the cutoff mechanism and the supply system of the lubricant nozzle may be controlled either automatically or manually and will, in either case, provide the advantages described.

Having described my invention I claim:

1. A cutoff mechanism for a clay pipe extrusion machine having an extrusion die and a rotary drive shaft extending axially through the die, the drive shaft having means for rotating and braking the same, said cutoff mechanism comprising, a mounting block connected to the drive shaft, a cutoff blade, pivot means connecting one end of the blade to the mounting block, said pivot means being displaced laterally from the axis of the drive shaft, the blade being rotatable in unison with the mounting block in a plane adjacent the delivery end of the die and being free to pivot to retracted and extended positions relative to the mounting block, releasable detent means connected respectively to the blade and mounting block, the detent means being effective to engage and latch the blade in retracted position to the mounting block, the blade adapted to disengage the detent means and snap to extended position by centrifugal force acting on the blade upon rotation of the drive shaft and mounting block, whereby the free end of the blade is adapted to pierce the wall of the clay pipe extruded from the die and sever the same upon continued rotation of the mounting block and cutting blade.

2. A cutoff mechanism for a clay pipe extrusion machine having an extrusion die and a rotary drive shaft extending axially through the die, the drive shaft having means for rotating and braking the same, said cutoff mechanism comprising, a mounting block connected to the drive shaft, a cutoff blade, pivot means connecting one end of the blade to the mounting block, said pivot means being displaced laterally from the axis of the drive shaft, the blade being rotatable in unison with the mounting block in a plane adjacent the delivery end of the die and being free to pivot to retracted and extended positions relative to the mounting block, releasable detent means connected respectively to the blade and mounting block, the detent means being effective to latch the blade in retracted position to the mounting block, the blade adapted to disengage the detent means and snap to extended position by centrifugal force acting on the blade upon rotation of the drive shaft and mounting block whereby the free end of the blade is adapted to pierce the wall of the clay pipe extruded from the die and sever the same upon continued rotation of the blade, and stop means on said mounting block engageable with the blade and adapted to maintain the blade in extended position counter to the resistance acting upon the blade during the cutoff operation, pivot means adapting the blade to snap by momentum to retracted position when the drive shaft is braked to a stop at completion of the cutoff operation.

3. A cutoff mechanism for a clay pipe extrusion machine having an extrusion die and a rotary drive shaft extending axially through the die, the drive shaft having means for rotating and braking the same, said cutoff mechanism comprising, a mounting block connected to the drive shaft, a cutoff blade, pivot means connecting one end of the blade to the mounting block, said pivot means being displaced laterally from the axis of the drive shaft the blade being rotatable about the pivot means in a plane adjacent the delivery end of the die and being free to pivot to retracted and extended positions relative to the mounting block, the pivot means providing movement of the blade along the axis of the die, releasable detent means connected respectively to the blade and mounting block, the detent means being effective to latch the blade in retracted position to the mounting block, the blade adapted to disengage the detent means and snap to extended position by centrifugal force acting on the blade upon rotation of the drive shaft and mounting block, whereby the free end of the blade is adapted to pierce the wall of the clay pipe extruded from the die and sever the same upon continued rotation of the blade, the pivot means and blade being movable along the axis of the pipe away from the severed end thereof at completion of the cutoff operation, the pivot means adapting the blade to snap by momentum to retracted position when the drive shaft is braked to a stop at completion of the cutoff operation.

4. A rotatable cutoff mechanism for a sewer pipe extrusion machine having an extrusion die and a rotary drive shaft extending through the die, the drive shaft having means for rotating and braking the same, said cutoff mechanism comprising, a knife mounting member secured upon said drive shaft, a cutting blade, pivotal mounting means connecting one end of said blade to the mounting element, said pivotal means providing swinging motion of the blade to retracted and extended positions in a cutting plane at right angles to the axis of the drive shaft, a detent member secured to the pivotal mounting means of the knife, the knife mounting member having a notch positioned to receive said detent member when the cutting blade is swung to retracted position the detent member releasably latching the cutting blade in said retracted position, said blade and pivotal means being movable bodily along the axis of the drive shaft and adapted to swing to extended position upon rotation of the drive shaft and to swing to retracted position upon braking of the shaft, a stop element on the mounting member, the stop element disposed in a position to maintain the rotating blade in extended position whereby the outer end portion of the blade is adapted to pierce and sever the wall of the sewer pipe adjacent the end of the sewer pipe upon rotation of the drive shaft.

5. A rotatable cutoff mechanism for a clay pipe machine having an extrusion die and having a drive shaft in said die including means for rotating and stopping the drive shaft, said cutoff mechanism mounted adjacent the end of the extrusion die and adapted to reside within the sewer pipe during the extrusion thereof and to sever the pipe upon being rotated, said cutoff mechanism comprising, a mounting block connected to said drive shaft, a rotatable blade mounting shaft journalled in said block upon an axis parallel with the drive shaft and displaced laterally therefrom, a cutoff blade secured upon the blade shaft and adapted to swing to retracted and extended positions relative to the mounting block, said cutoff blade having a cutting edge which is chamfered in a direction to cause the blade to plane during rotation toward the die in a direction counter to the advancement of the pipe during extrusion thereof, abutment means on said block adapted to maintain the blade in a retracted position with the axis of the blade displaced outwardly relative to the axis of the drive shaft, whereby the blade is extended by centrifugal force by rotation of the shaft, and a second abutment on said shaft adapted to engage and maintain the blade in extended position during the cutting operation and adapting the blade to snap to retracted position when the driving system is braked.

6. A cutoff mechanism for a clay pipe extruding machine having an extrusion die and having a rotary drive shaft extending axially through the die, the drive shaft having means for rotating and braking the same, said cutoff mechanism comprising, a mounting block connected to the drive shaft, a pivot shaft journalled in said block upon an axis parallel with the drive shaft and displaced laterally therefrom, said pivot shaft being movable axially relative to the mounting block, a blade having an end secured to said pivot shaft, the blade being free to swing in a plane adjacent the end of the die to retracted and extended positions relative to the mounting block and being movable with the axially movable pivot shaft in a direction parallel to the axis of the drive shaft, the blade being normally maintained in retracted position with the axis of the blade displaced laterally from the drive shaft in position to be snapped to open position by centrifugal force upon rotation of the drive shaft, the blade thereby adapted to pierce the wall of the clay pipe expressed from the extrusion die, the blade having a cutting edge which is chamfered in a direction to plane the blade toward the discharge end of the extrusion die, and means biasing the pivot shaft for axial movement in the opposite direction, whereby the blade moves away from the die and severed end of the pipe upon severing the same in a position to swing to retracted position without resistance when the drive shaft is braked to a stop.

7. A cutoff mechanism for a clay pipe extruding machine, said extruding machine having a die adapted to extrude a clay pipe, the die having a rotary drive shaft extending axially therethrough, the drive shaft being connected to the power means for abruptly rotating and braking the drive shaft, said cutoff mechanism comprising a mounting element connected to the drive shaft, a cutoff blade, axially shiftable pivot means connecting one end of the blade to said mounting element, said pivotal means being displaced outwardly from the axis of the drive shaft, the cutoff blade adapted to swing in a plane adjacent the die to retracted and extended position with respect to the mounting element, the cutoff blade being normally maintained in a retracted position with the blade displaced outwardly from the axis of the drive shaft and substantially bisecting said axis, said pivot means adapted to pivot the blade by centrifugal force from retracted to extended position upon rotation of the drive shaft, whereby the blade pierces the wall of the clay pipe, cooperating detent members on the mounting element and pivot means, said detent members releasably latching the blade in retracted position and adapting the same to swing to extended position upon rotation of the drive shaft, and an abutment on said mounting element engageable with the blade when the same is extended, said abutment maintaining the blade in extended position whereby the blade is rotated in unison with the mounting element to sever the extruded pipe by continued rotation thereof.

8. A cutoff mechanism for a clay pipe extrusion machine having an extrusion die and a rotary drive shaft extending axially through the die, the drive shaft having means for rotating and braking the same, said cutoff mechanism comprising, a mounting block connected to the drive shaft, a set screw threaded in the mounting block and engaging the drive shaft adapting the block to be adjusted axially relative to the end of the extrusion die, a pivot shaft rotatably journalled in the mounting block upon an axis displaced laterally from the axis of the drive shaft and being movable axially relative to the mounting block, a cutoff blade having an end secured to said pivot shaft, the cutoff blade being disposed for rotation in a plane at one side of the mounting block and being free to swing to retracted and extended positions relative to the mounting block, the blade being movable in unison with the axial motion of the pivot shaft in a direction parallel to the axis of the drive shaft relative to the end of the extrusion die, said blade having a cutting edge which is chamfered in a direction to plane the blade toward the end of the extrusion die when the blade is extended and rotated to sever the pipe, whereby the extruded pipe is pierced in a plane outwardly from the end of the die upon being extended and thereafter moves in a spiral path toward the end of the die to sever the pipe flush with the end of the die upon continued rotation.

9. A cutoff mechanism for a clay pipe extrusion machine having an extrusion die and a rotary drive shaft extending axially through the die, the drive shaft having means for rotating and braking the same, said cutoff mechanism comprising, a mounting block connected to the drive shaft, a pivot shaft rotatably journalled in the mounting block upon an axis displaced laterally from the axis of the drive shaft and being movable axially relative to the mounting block, a cutoff blade having an end secured to said pivot shaft, the cutoff blade being disposed for rotation in a plane at one side of the mounting block and being free to swing to retracted and extended positions relative to the mounting block, the blade being movable in unison with the axial motion of the pivot shaft in a direction parallel to the axis of the drive shaft relative to the end of the extrusion die, said mounting block having a detent notch formed therein, a collar secured upon the pivot shaft and having a detent element engaging the notch of the mounting block, when the blade is swung to retracted position, spring means engaging said collar and urging the same toward the mounting block whereby said detent notch and detent element are effective to latch the blade normally in retracted position and to release the same in response to centrifugal force acting upon the blade upon rotation of the drive shaft, the detent notch and detent element being effective to move the blade toward the end of the die as the blade swings to extended position.

10. A cutoff mechanism for a clay pipe extruding machine having an extrusion die and having a rotary drive shaft extending axially through the die, the drive shaft having means for rotating and braking the same, said cutoff mechanism comprising, a mounting block connected to the drive shaft, a pivot shaft rotatably journalled in said block upon an axis parallel with the drive shaft and displaced laterally therefrom, said pivot shaft being movable axially relative to the mounting block, a bracket mounted upon the mounting block and extending toward the die, said mounting shaft having an outer end journalled in said bracket, a cutoff blade secured upon the opposite end of said blade shaft and adapted to swing to extended and retracted position relative to the mounting block, the blade adapted to move in unison with the axial movement of the pivot shaft relative to the end of the extrusion die, a collar secured to the blade mounting shaft and disposed between said bracket and mounting block, said collar having a spur projecting toward the mounting block and providing angular cam surfaces, the block having a notch providing angular cam surfaces and adapted to receive said spur when the blade is swung to retracted position, and a spring interposed in compression between said bracket and collar normally urging the collar toward the mounting block, said spur being effective to latch the blade to the mounting block in retracted position, said blade being effective to disengage said spur in response to centrifugal force acting upon the blade by rotation of the drive shaft, whereby said cam surfaces are effective to shift the blade shaft and blade axially toward the die as the blade swings to extended position.

11. A cutoff mechanism for a clay pipe extruding machine having an extrusion die and having a rotary drive shaft extending axially through the die, the drive shaft having means for rotating and braking the same, said cutoff mechanism comprising, a mounting block connected to the drive shaft, a pivot shaft rotatably journalled in said block upon an axis parallel with the drive shaft and displaced laterally therefrom, said pivot shaft being movable axially relative to the mounting block, a bracket mounted upon the mounting block and extending toward the die, said mounting shaft having an outer end journalled in said bracket, a cutoff blade secured upon the opposite end of said blade shaft and adapted to swing to extended and retracted position relative to the mounting block, the blade adapted to move in unison with the axial movement of the pivot shaft relative to the end of the extrusion die, a collar secured to the blade mounting shaft and disposed between said bracket and mounting block, said collar having a spur projecting toward the mounting block, and providing angular cam surfaces, the block having a notch providing angular cam surfaces and adapted to receive said spur when the blade is swung to retracted position, and a spring interposed in compression between said bracket and collar normally urging the collar toward the mounting block, said spur being effective to latch the blade to the mounting block in retracted position, said blade being effective to disengage said spur in response to centrifugal force acting upon the blade by rotation of the drive shaft whereby said cam surfaces are effective to shift the blade shaft and blade axially toward the die as the blade swings to extended position, the mounting block having a flat surface adjoining said notch and providing a bearing for the spur when the blade swings to extended position, the spring having its opposite ends anchored to the bracket and collar respectively and providing a torque force urging the blade toward retracted position.

12. A pipe cutting and die lubricating apparatus for a clay pipe extrusion machine having an extrusion die, a former die and a former cap movable relative to the former die, said apparatus comprising, a drive shaft including means for rotating and braking the same, the shaft extending axially through the extrusion die, the shaft having a lubricant bore extending to one end thereof and including means for supplying lubricant and compressed air to the bore intermittently, a mounting block connected to said shaft, a cutoff blade shiftably connected to the mounting block, the blade being adapted to shift to extended and retracted positions relative to the mounting block in response to rotation and braking of the drive shaft, a lubricant nozzle mounted upon the end of the drive shaft adjacent the mounting block and in communication with the lubricant bore, said nozzle comprising a hollow body having a bottom member and having lubricant discharge apertures disposed outwardly from the center thereof, said bottom member adapted to accumulate residual lubricant which drains from the lubricant bore after a discharge thereof, the nozzle being rotatable in unison with said mounting block whereby the rotation of the drive shaft is effective to extend the blade and concurrently spread the lubricant from the bottom member outwardly toward the discharge apertures by centrifugal force in position to be ejected through said apertures upon intermittent application of compressed air and lubricant to the lubricant bore for deposit upon the surface of the former cap and die.

13. A pipe cutting and die lubricating apparatus for a clay pipe extrusion machine having an extrusion die, a former die and a former cap movable relative to the former die, said apparatus comprising, a vertical drive shaft including means for rotating and braking the same, the shaft extending axially through the extrusion die, the shaft having a lubricant bore extending to the lower end thereof and including means for supplying lubricant to the bore intermittently, a mounting block connected to said shaft, a cutoff blade shiftably connected to the mounting block, the blade being adapted to shift to extended and retracted positions relative to the mounting block in response to rotation and braking of the drive shaft, a lubricant nozzle mounted upon the lower end of the drive shaft below the mounting block and in communication with the lubricant bore, said nozzle comprising a disc-shaped hollow body having a bottom member and a peripheral side wall, the lubricant nozzle having discharge apertures around its periphery, said bottom member having a reservoir adapted to receive and accumulate residual lubricant which drains from the lubricant bore after a discharge thereof, the nozzle being rotatable in unison with said mounting block whereby the rotation thereof is effective to extend the blade and concurrently spread the lubricant from the reservoir outwardly toward the periphery by centrifugal force in position to be ejected through said apertures for deposit upon the surfaces of the former cap and die.

14. A pipe cutting and die lubricating apparatus for a clay pipe extrusion machine having an extrusion die, a former die and a former cap movable relative to the former die, said apparatus comprising, a vertical drive shaft including means for rotating and braking the same, the shaft extending axially through the extrusion die, the shaft having a lubricant bore extending to the lower end thereof and including means for supplying lubricant and compressed air to the bore intermittently, a mounting block connected to said shaft, a cutoff blade having an end pivotally connected to the mounting block, the blade adapted to pivot to extended and retracted positions relative to the mounting block in response to rotation and braking of the drive shaft, a lubricant nozzle mounted upon the lower end of the drive shaft below the mounting block, said nozzle having a circular top plate connected at its center to the drive shaft, a flat bottom plate spaced downwardly from the top plate, and a peripheral side wall joining said spaced plates, the lubricant bore being in communication with the space between said top and bottom plates, the peripheral wall having discharge apertures adjacent thereto, said flat bottom plate having a depressed area at its center adapted to receive and accumulate lubricant which drains from said lubricant bore after a discharge thereof, the nozzle being rotatable in unison with said mounting block whereby the rotation thereof is effective to extend the blade and concurrently spread the lubricant from the depressed area across the bottom plate outwardly toward said apertures by centrifugal force in position to be sprayed through said apertures upon intermittent application of compressed air and lubricant to the lubricant bore for deposit upon the surfaces of the former cap and die.

15. A lubricant nozzle adapted to receive intermittent blasts of compressed air and lubricant and to deposit a lubricant film upon the surfaces of the former die and movable former cap of a clay pipe extrusion machine, said lubricant nozzle comprising, a pair of spaced top and bottom members peripherally joined together and forming a hollow nozzle body, means for mounting the nozzle body relative to the former die with the body disposed in a horizontal plane, the top member of said body including a passageway to receive said intermittent blasts of compressed air and lubricant, said bottom member having a cavity therein, the periphery of the nozzle having a series of lubricant discharge apertures, said cavity being disposed in a position to receive and accumulate residual lubricant which drains downwardly through said passageway following an intermittent blast therethrough, said passageway adapted to direct the blast of compressed air into said cavity and thereby expel the accumulated lubricant from the cavity and distribute the same outwardly for ejection through the lubricant apertures and deposit upon the die surfaces.

16. A lubricant nozzle adapted to apply a lubricant film to the surfaces of the former die and movable former cap of a clay pipe extrusion machine, said lubricant nozzle comprising, a mounting nipple having an axial lubricant bore, means for mounting the nipple relative to the former die and for intermittently blasting compressed air and entrained lubricant through the bore of the nipple, a plate forming the top of the nozzle and attached to the end of said nipple, said nipple extending through said plate with the bore of the nipple perpendicular to the plane of the plate, a bottom plate spaced downwardly from said top plate, a peripheral wall joining said plates together in spaced relationship, said bottom plate having a lubricant reservoir, the periphery of the nozzle having a series of lubricant discharge apertures, said reservoir being disposed in a position to receive and accumulate residual lubricant which drains downwardly through the bore of said nipple following an intermittent blast therethrough, said bore adapted to direct the blast of compressed air into said reservoir and thereby expel the accumulated lubricant from the reservoir and distribute the same outwardly for ejection through the lubricant apertures and deposit upon the die surfaces.

17. A lubricant nozzle adapted to apply a lubricant film to the surfaces of the former die and movable former cap of a clay pipe extrusion machine, said lubricant nozzle comprising, a mounting nipple having an axial lubricant bore extending therethrough, means for mounting an end of the nipple relative to the former die and for intermittent blasting compressed air and entrained lubricant through the bore of the nipple, a circular plate forming the top of the nozzle and attached to the end of said nipple, said nipple extending through the center of said plate with the bore of the nipple perpendicular to the plane of the plate, a circular bottom plate spaced downwardly from said top plate, a peripheral wall joining said plates together in spaced relationship, said bottom plate having a shallow cavity in the center area thereof, the periphery of the nozzle having a series of lubricant discharge apertures, said shallow cavity being disposed in a position to receive and accumulate residual lubricant which drains downwardly through the bore of said nipple following an intermittent blast therethrough, said bore adapted to direct the blast of compressed air into said cavity and thereby expel the accumulated lubricant from the cavity and distribute the same outwardly for ejection through the lubricant apertures and deposit upon the die surfaces.

References Cited in the file of this patent

UNITED STATES PATENTS

| Number | Name | Date |
|---|---|---|
| 2,047,699 | MacLachlan | July 14, 1936 |
| 2,480,442 | Booth | Aug. 30, 1949 |
| 2,497,724 | Gilson et al. | Feb. 14, 1950 |